(12) United States Patent
Friedland et al.

(10) Patent No.: US 7,556,314 B2
(45) Date of Patent: Jul. 7, 2009

(54) REMOVEABLE CAR SEAT COVER

(75) Inventors: Allen Friedland, Hockessin, DE (US);
Stacey Friedland, Hockessin, DE (US);
Mark C. Gregory, Wilmington, DE (US)

(73) Assignee: Allen and Stacey Friedland, Hockessin, DE (US)

( * ) Notice: Subject to any disclaimer, the term of this patent is extended or adjusted under 35 U.S.C. 154(b) by 0 days.

(21) Appl. No.: 11/539,143

(22) Filed: Oct. 5, 2006

(65) Prior Publication Data

US 2007/0085392 A1 Apr. 19, 2007

Related U.S. Application Data

(60) Provisional application No. 60/723,886, filed on Oct. 5, 2005.

(51) Int. Cl.
*A47C 31/11* (2006.01)

(52) U.S. Cl. .................................. 297/291.12

(58) Field of Classification Search ............ 297/219.12, 297/230.1, 230.13–230.14, 184.13, 184.11, 297/223–225, 228–229, 250.1, DIG. 5
See application file for complete search history.

(56) References Cited

U.S. PATENT DOCUMENTS

| | | | |
|---|---|---|---|
| 3,544,953 A * | 12/1970 | Shannon | 439/522 |
| 4,883,701 A | 11/1989 | Rankin et al. | |
| 4,885,200 A | 12/1989 | Perdelwitz, Jr. et al. | |
| 4,891,454 A | 1/1990 | Perdelwitz, Jr. et al. | |
| 4,892,769 A * | 1/1990 | Perdelwitz et al. | 428/68 |
| D312,549 S * | 12/1990 | Perdelwitz et al. | D6/611 |
| D312,550 S | 12/1990 | Rankin et al. | |
| D313,723 S | 1/1991 | Rankin et al. | |
| 4,993,090 A | 2/1991 | Ranalli | |
| 5,842,739 A | 12/1998 | Noble | |
| 5,979,981 A | 11/1999 | Dunne et al. | |
| 6,036,263 A | 3/2000 | Gold | |
| 6,752,457 B2 | 6/2004 | Gold et al. | |
| 6,926,359 B2 * | 8/2005 | Runk | 297/219.12 |
| 7,410,213 B1 * | 8/2008 | Ferrari-Cicero et al. | 297/219.12 |
| 2004/0207239 A1 * | 10/2004 | King | 297/219.12 |
| 2004/0239163 A1 | 12/2004 | Runk | |
| 2005/0110315 A1 * | 5/2005 | Littlehorn et al. | 297/219.12 |

OTHER PUBLICATIONS

International Search Report for PCT/US06/38976, dated Sep. 25, 2007.

* cited by examiner

*Primary Examiner*—Rodney B White
*Assistant Examiner*—Kaitlin A. Wilson
(74) *Attorney, Agent, or Firm*—Gomez International Patent Office, LLC; Brian A. Gomez

(57) ABSTRACT

A removable child car seat cover that enables removal of the cover without requiring that the car seat be removed from the car.

2 Claims, 15 Drawing Sheets

REMOVEABLE CAR SEAT COVER

This application claims the benefit of U.S. Provisional Application Ser. No. 60/723,886, filed Oct. 5, 2005.

BACKGROUND OF THE INVENTION

The present invention relates to child car seats that can be removed and secured within an automobile, and more particularly, to a removeable cover for such car seats.

Children's car seats typically comprise a car seat and a padded cover. The car seat is also called a shell or frame or base. Because children are messy, it is generally known that car seat covers will require cleaning, and thus there have been car seat covers that can be removed. Prior car seat covers are removable, but to remove the prior car seat covers, the car seat must be removed from the car, and the restraints or seat belts must be released from the car seat. Car seats are often difficult to properly install into a vehicle, so it is not desirable to have to remove the car seat every time the car seat cover needs to be cleaned. Accordingly, there is a need for a car seat cover that can be removed from the seat while the seat is positioned in the car and while the safety belts and other restraints are attached.

SUMMARY OF THE INVENTION

The present invention provides a solution to the needs not addressed by the prior art. Specifically, the present invention provides an improved child car seat cover adapted to cover a car seat shell and comprising a back portion joined to a bottom portion, the back portion of the cover further comprising at least two shoulder strap slots extending to an external perimeter point of the backrest portion of the cover, the bottom portion of the cover further comprising at least two thigh belt openings extending from the bottom portion to an external perimeter point of the bottom portion of the cover, wherein the shoulder belt slots are positioned to allow the shoulder belts and thigh belts of the car seat to extend through the slots to secure a child sitting in the seat.

The present invention also provides a child car seat cover adapted for use with a child car seat, the child car seat comprising a substantially vertically oriented back portion and a substantially horizontally oriented bottom portion, at least one shoulder belt and at least one thigh belt, the belts being adjustable with respect to the seat and releasably attachable to each other, the cover comprising substantially vertically and centrally oriented back flap defined by two substantially vertical slots, the back flap further comprising at least one means of releasably attaching the flap to the seat cover, and a substantially horizontally and centrally oriented bottom flap defined by two substantially horizontal slots, the bottom flap further comprising at least one means of releaseably attaching the flap to the seat cover.

In addition, the present invention provides a removable child car seat cover comprising a first slot extending from a point on the exterior perimeter of the seat cover and communicating with at least one shoulder strap slot on the car seat, and a second slot extending from two points in the car seat bottom portion and terminating at a point on the perimeter.

The present invention also provides a removable child car seat cover comprising a single slot extending to a point on the perimeter of the cover, the slot being positioned to interact with each strap or belt of the car seat.

The present invention also provides a child car seat cover comprising two slots, an upper substantially vertical slot and a lower "v" shaped slot or substantially horizontal slot.

The present invention also provides a child car seat cover adapted for use with a car seat, the cover comprising a single slot, the slot extending from a perimeter of the car seat cover at one end, and positioned to operatively connect to at least one seat belt in the car seat.

Finally, the present invention also provides a child car seat cover comprising 2 flaps and 4 slots.

DETAILED DESCRIPTION OF THE INVENTION

Figure 1:
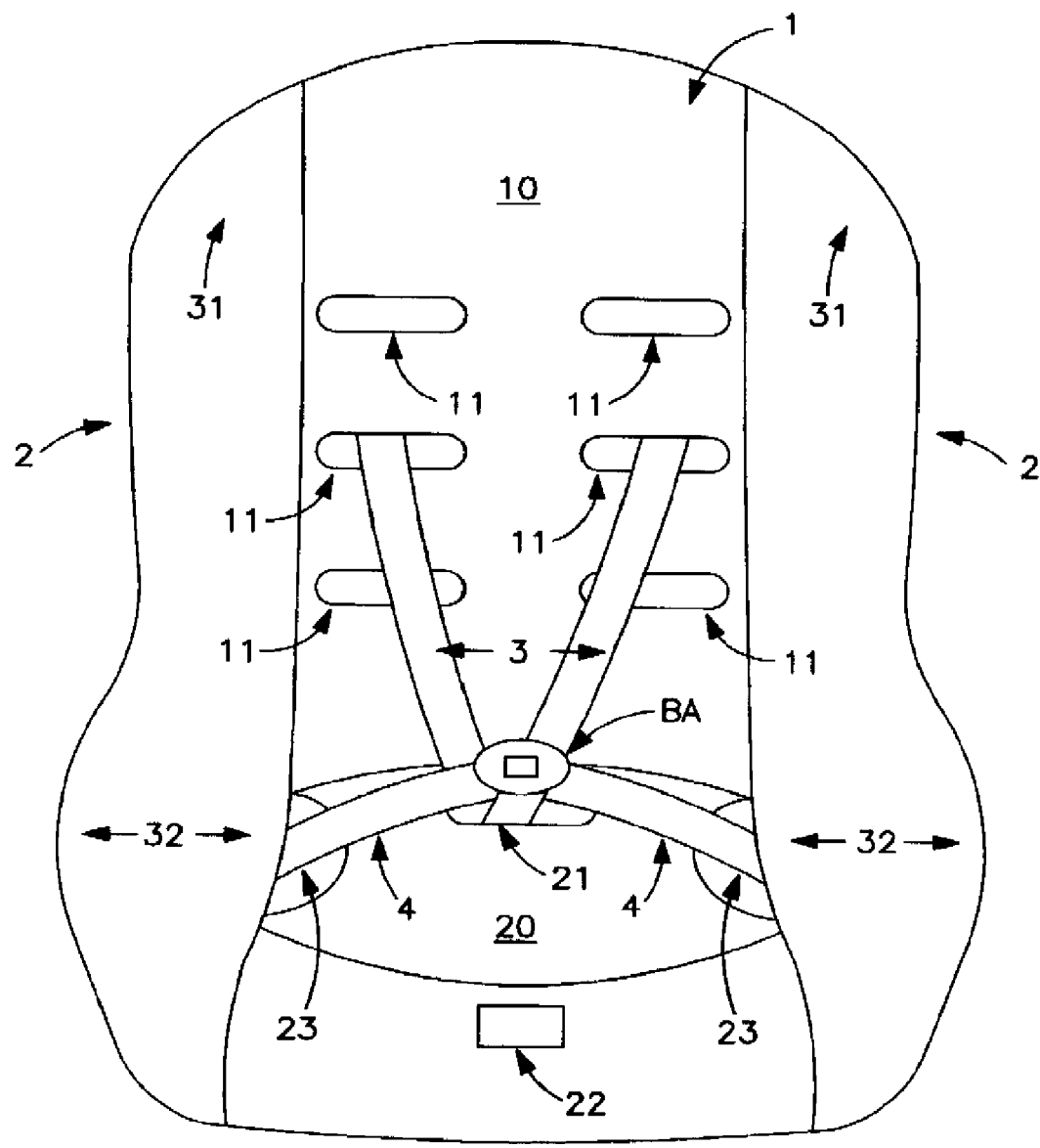
FIG. 1 is a front view of one embodiment of a child car seat cover of the present invention installed on a car seat.
Figure 2:
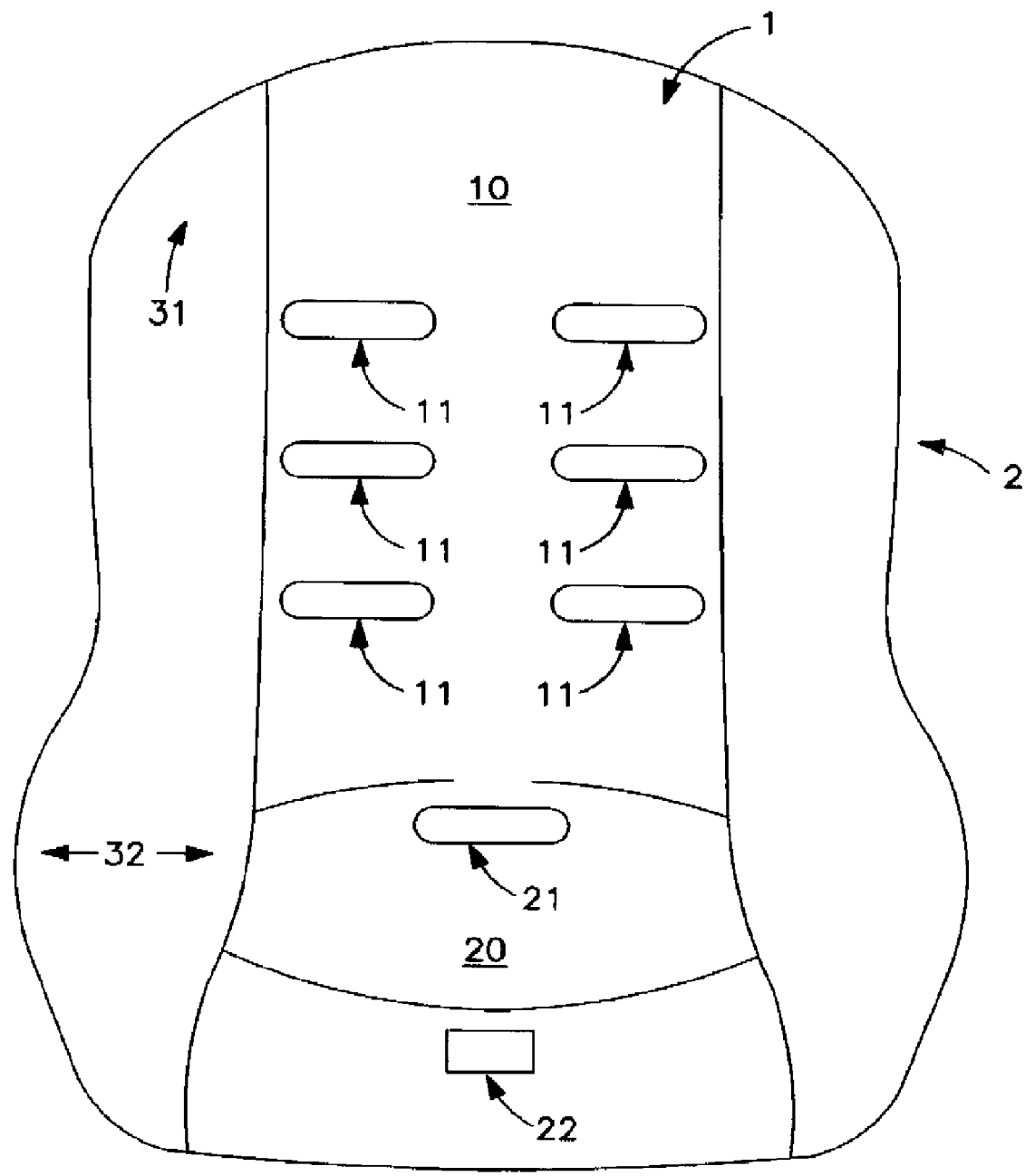
FIG. 2 is a front view of the car seat cover of FIG. 1 without the car seat.

The features, aspects and advantages of all embodiments of the present invention will become apparent from the following detailed description and the accompany exemplary embodiments shown in the drawing figures. Variations and modifications of the present invention are within the scope of the invention, and will be apparent to one skilled in the art. It is to be understood that the invention is not limited in its application to the details of construction and the arrangement of components described below and illustrated in the drawing figures. Those skilled in the art will recognize that various modifications can be made without departing from the scope of the invention as disclosed herein. The invention provides a car seat cover with a means for removing the car seat cover from the car seat without requiring that the car seat itself be removed.

In FIGS. 1-11, preferred embodiments of the child car seat cover of the present invention (1) are typically shaped to conform considerably to the car seat or car seat shell (2), and can further comprise means of securing the cover to the seat.

Such means of securing the cover to the seat can include snaps, clips, elastic or mating hook and loop fasteners. Typically, a car seat or car seat shell comprises a base, a back, a seat, and at least one seat belt or restraint. Many car seats comprise two shoulder straps emerging from the back portion of the car seat and adapted to connect with a lap belt which typically is associated with the seat portion of the car seat. Generally, the car seat covers of the present invention can comprise a substantially vertically oriented back portion (10) connected to a substantially horizontally oriented bottom portion (20) both of which are connected to two side bolster portions (31 and 32). (See FIG. 1).

The child car seat cover (1) of the present invention can be shaped and secured to conform considerably to the car seat shell (2). Child car seat cover comprises a substantially vertically oriented back portion (10) connected to a substantially horizontally oriented bottom portion (20) (See FIG. 2)

For ease of identification and for purpose of function we will subdivide the description and figures of the child car seat cover (1) as the upper assembly and lower assembly.

Figure 3:
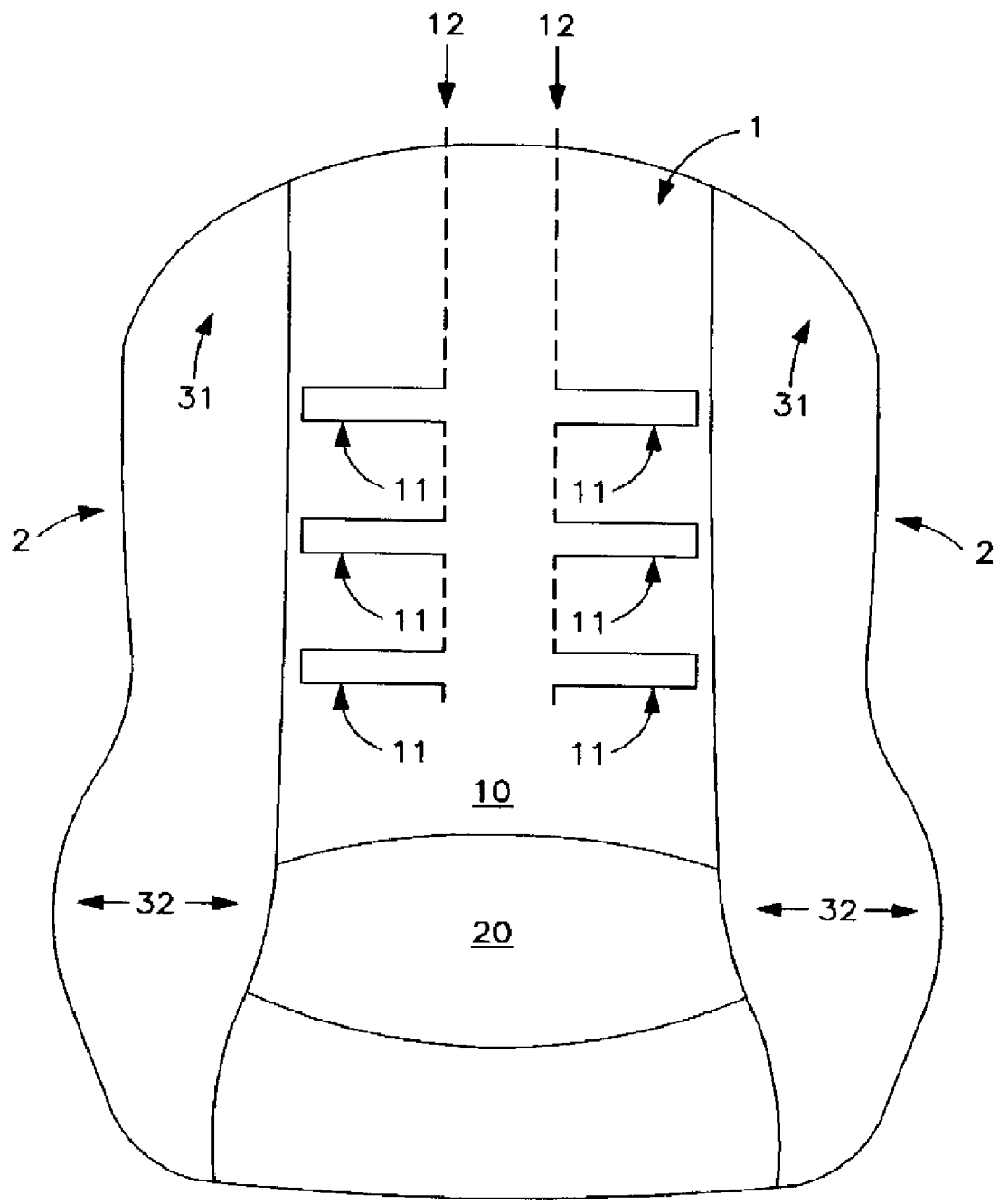
FIG. 3 is a front view of the car seat cover of FIG. 1, showing two slots or one flap.
Figure 3A:
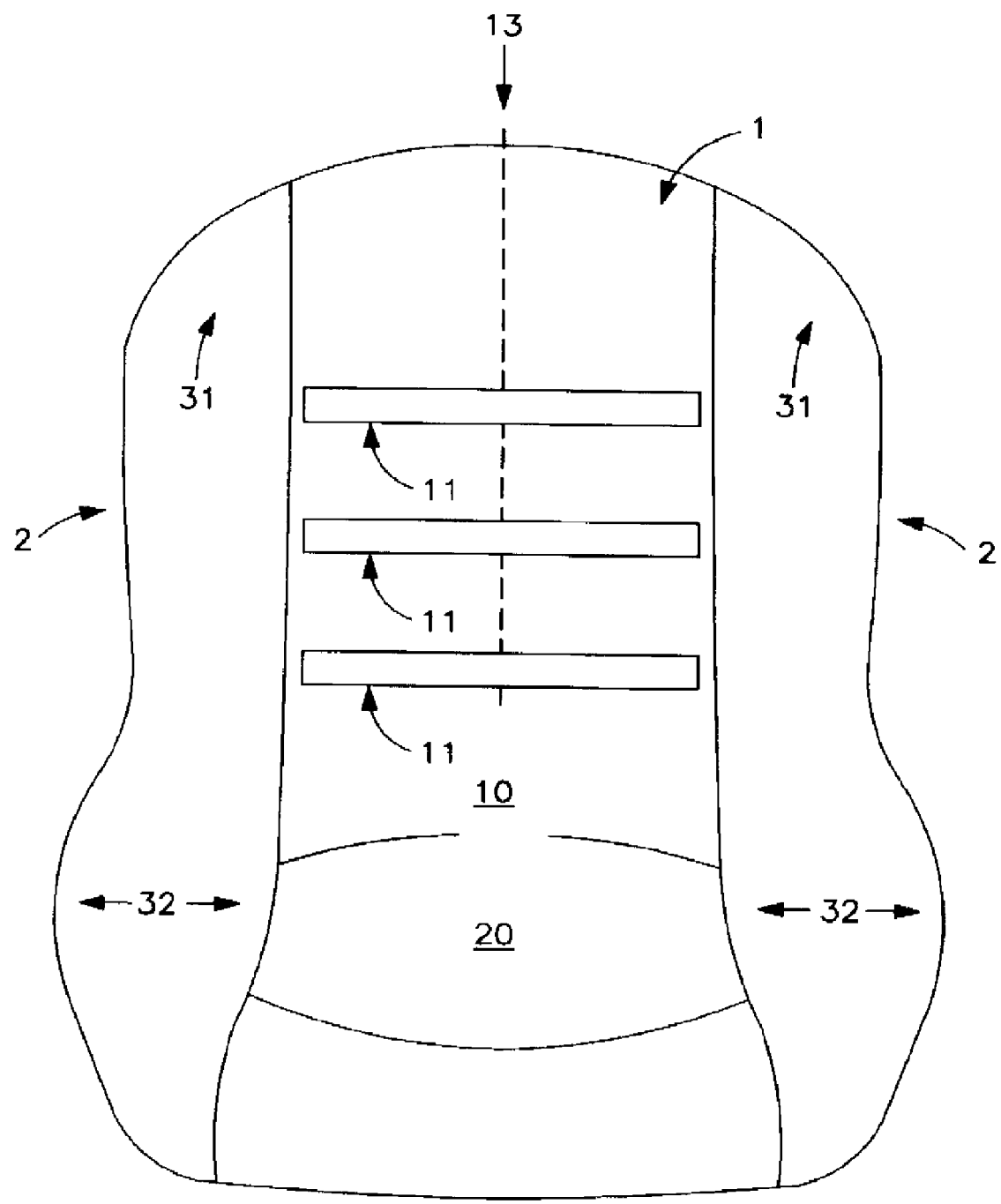
FIG. 3a is a front view of a car seat cover of the invention showing one vertical slot.

Upper assembly: The upper assembly of the various embodiments of the child car seat cover of the present invention can be defined by the back portion (10), the vertical portions of the side bolsters (31) (where applicable), at least one slot, typically two shoulder belt slots (11), and at least one substantially vertically oriented slot(s) (12 or 13) that may create a back flap and that allow for removal of the car seat cover while leaving the shoulder belts in their place. (See FIG. 3 and 3a).

Figure 4:
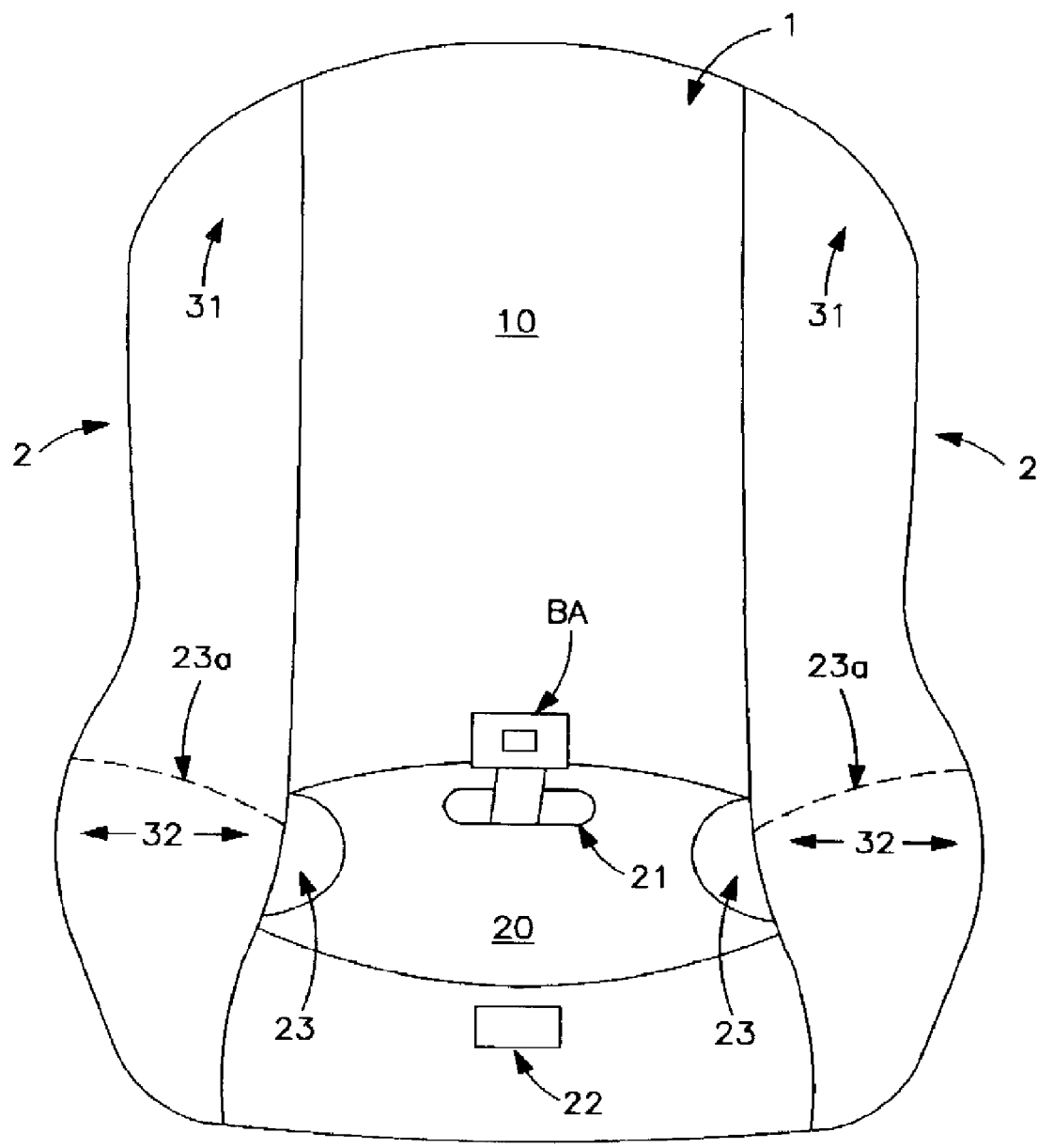
FIG. 4 is a front view of the car seat cover of FIG. 1 showing the horizontally oriented slot.
Figure 4A:
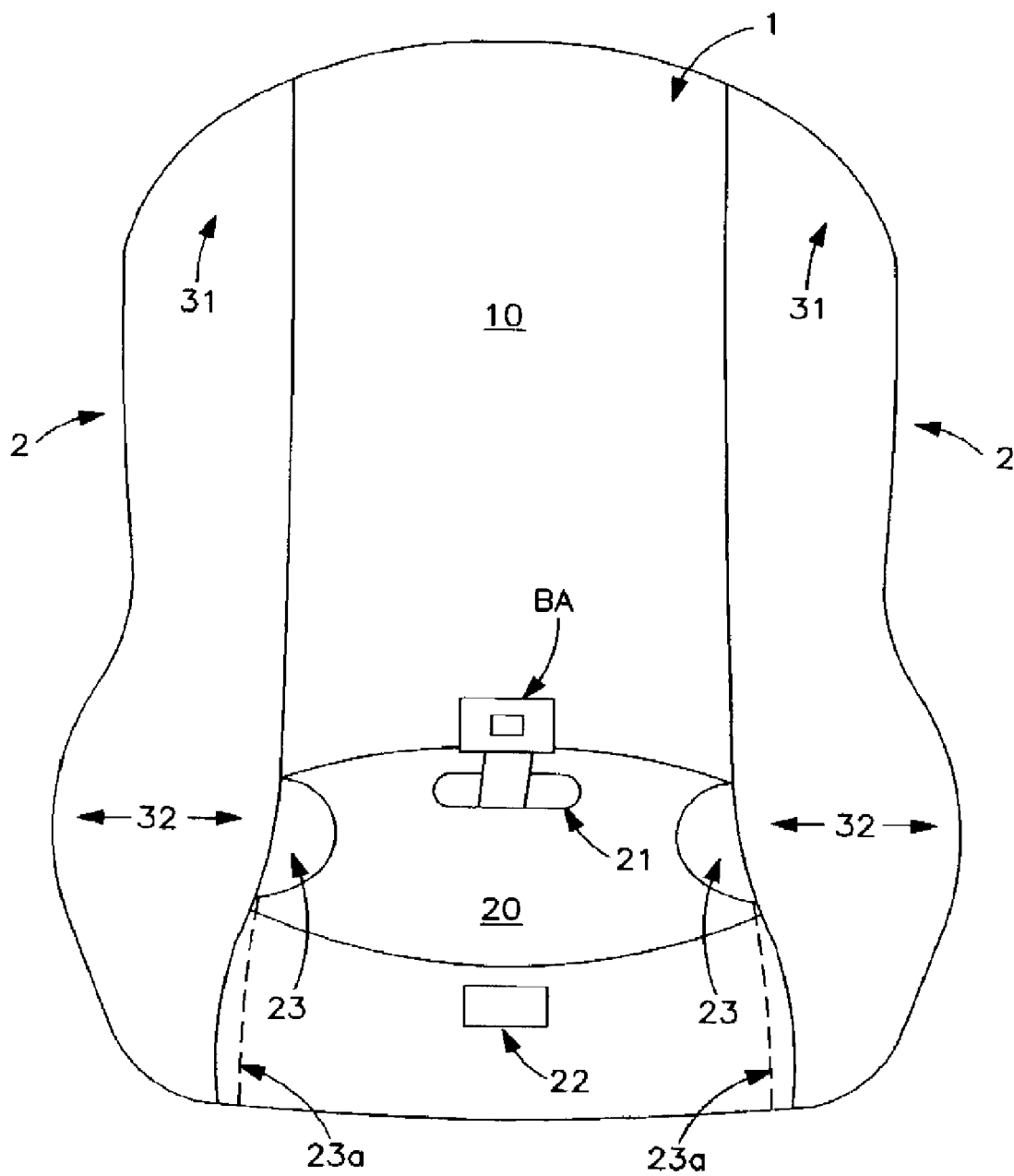
FIG. 4a is a front view of an alternate embodiment of the car seat cover of FIG. 4.
Figure 4B:
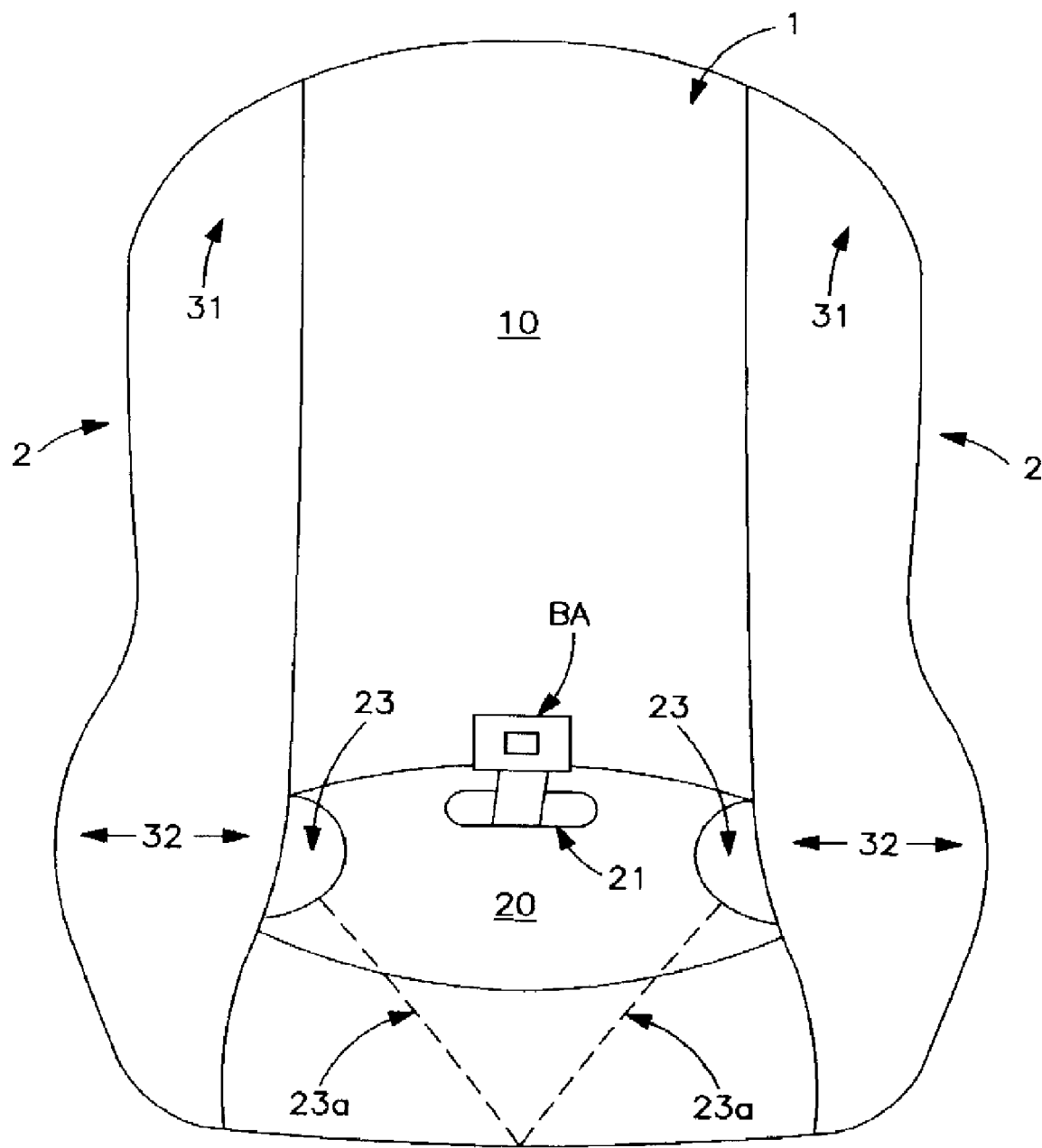
FIG. 4b is a front view of an alternate embodiment of the car seat cover of FIG. 4.
Figure 4C:
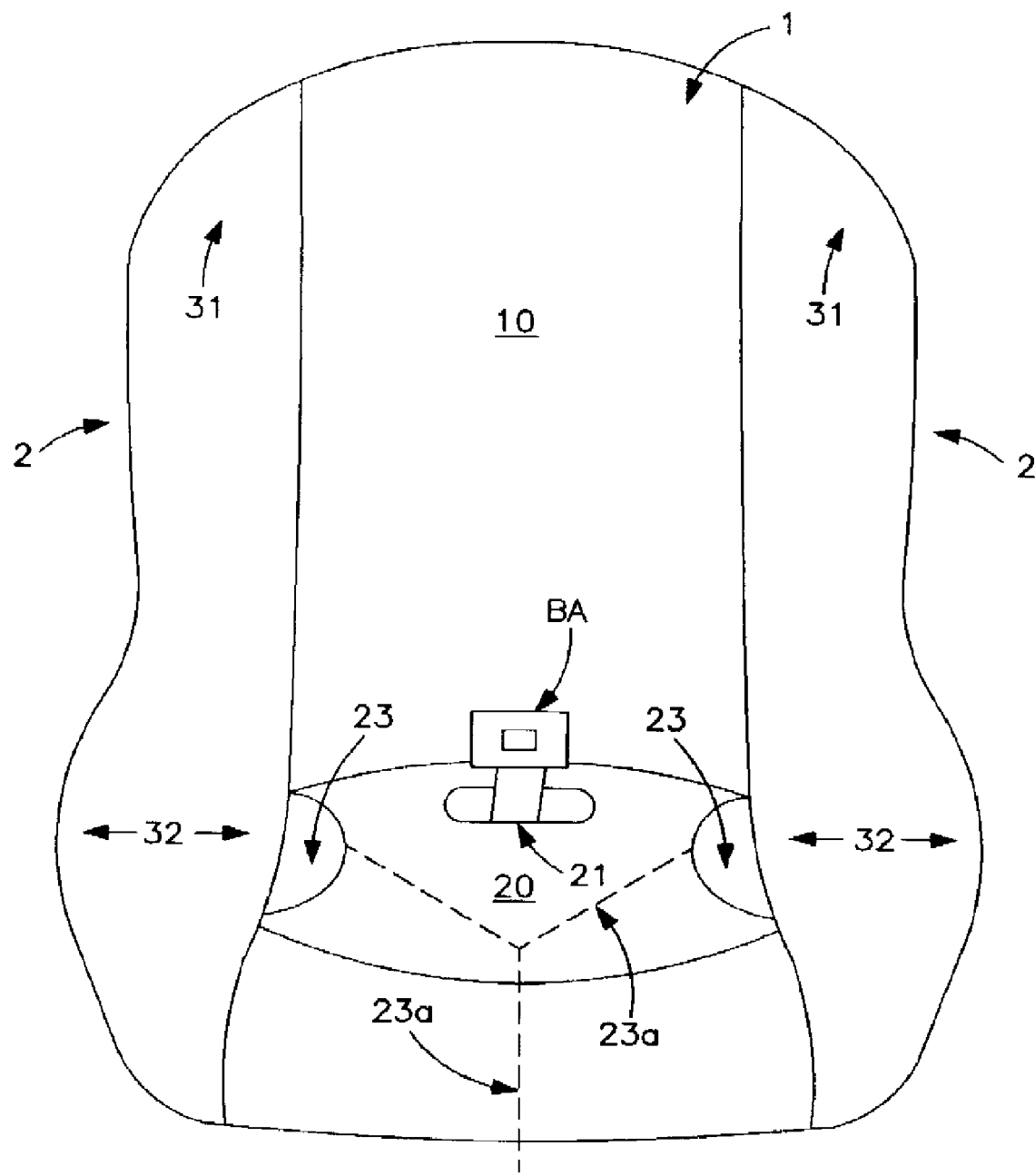
FIG. 4c is a front view of an alternate embodiment of the car seat cover of FIG. 4.
Figure 5:
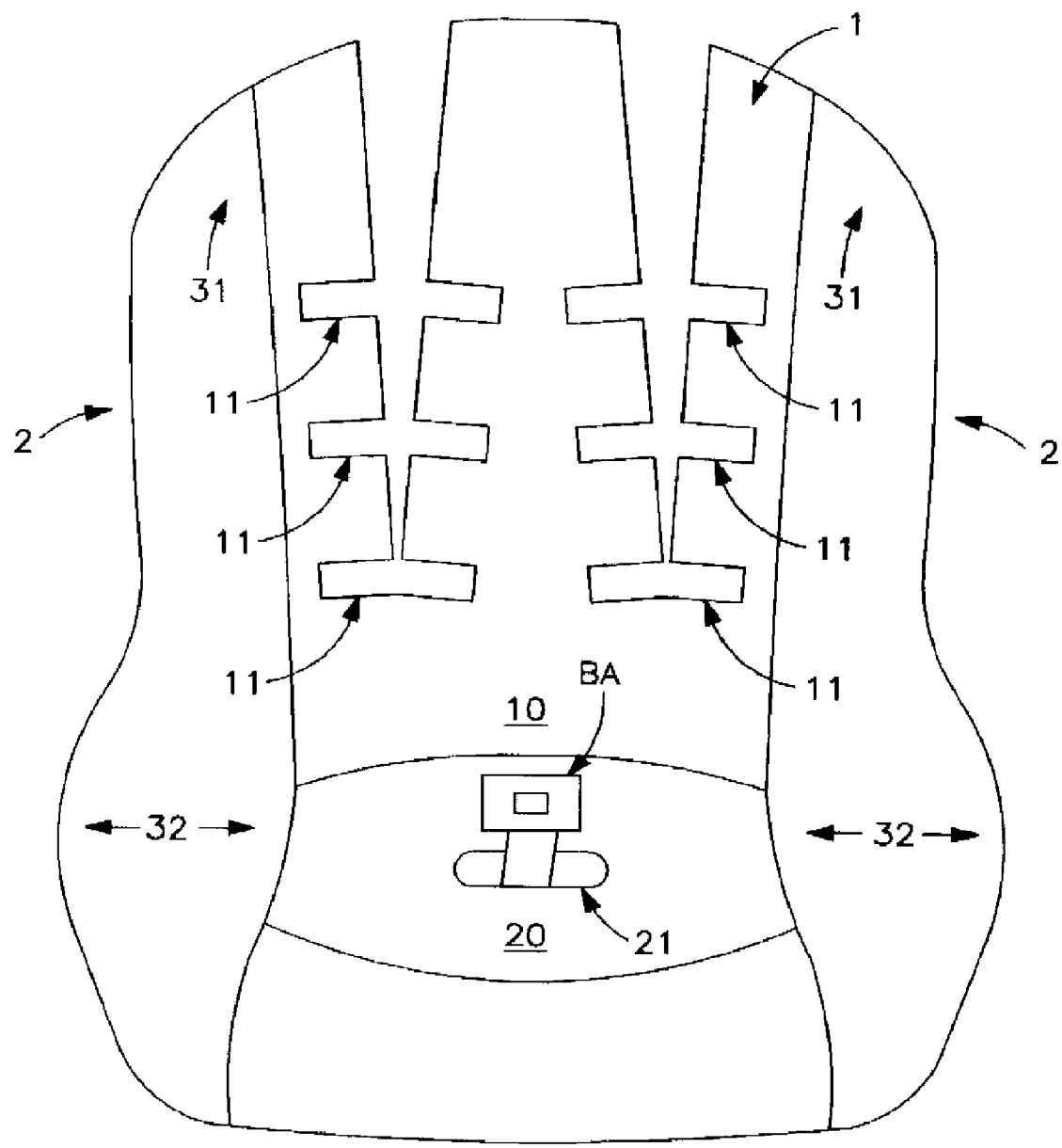
FIG. 5 is a front view of the car seat cover of FIG. 3, shown partially disassembled to show the back flap or bottom flap and 2 upper slots.

Lower assembly: The lower assembly of the child car seat cover of the present invention can be defined by the bottom portion (20), the horizontal portions of the side bolsters (32) (where applicable), opening for the buckle assembly (21), opening for the harness adjuster (22) (where applicable), openings for thigh belts (23) and horizontally (see FIG. 4) (23a) or vertically (23a) (see FIGS. 4a and 4b) oriented slots that may create a bottom flap (BoF). Horizontal in the lower assembly is defined in terms of the child car seat cover removed from the car seat shell and the child car seat cover is placed flat in one plane. These slots allow for removal of the car seat cover of the present invention while leaving the lap or thigh belts or straps in their place.

In embodiments of the present invention for use with a child car seat that requires a harness, the car seat cover will differ from the previous embodiments. The five point harness is defined by and anchored to the seat at five locations: the top of each of two shoulder belts (3), in the crotch region with a buckle assembly (BA), and at the ends of two thigh belts (4).

The three point harness is defined by and anchored to the seat at three locations: the top of each of two shoulder belts (3), and in the crotch region with a buckle assembly (21).

For the upper assembly of both harness types: both of two shoulder belts (3) are threaded through one of several vertically spaced or vertically spaced pairs of substantially horizontally oriented slots (11) within the back portion of the child car seat cover and back portion of the car seat shell and are anchored in the back of the molded car seat shell.

For the lower assembly of both harness types, there is a crotch opening(s) (21) in proximity with the seat anchor location(s) for the buckle assembly. The buckle assembly can include a buckle that is tethered to the car seat shell by a short strap, and the crotch opening(s) (21) is large enough to allow the buckle to pass through it. The buckle assembly may enter the bottom portion through multiple entry positions in the crotch region. There also may be a harness adjuster opening (22) in the bottom portion of the car seat shell and child car seat cover.

For some three point harnesses: The lower assembly of some car seat shells may have a tang that is recessed in the bottom portion and reversably receives a buckle that is already connected to the shoulder belts.

For a five point harness: some thigh belts (4) are actually the lower portions of shoulder belts (3). In other five-point harnesses the thigh belts may be discrete belts that are joined to the shoulder belts at the buckle assembly. Thus the term "thigh belts" as used in this application means the belts of the harness that engages the thigh of the child occupant, whether they are portions of the shoulder belts or discrete strap elements that are joined to the shoulder belts. The thigh belts (4) may be anchored at different locations depending on the car seat shell. Some are anchored in the bottom portion of the seat, or may be anchored where the seat bottom meets the back portion or anchored where the bottom portion meets the side bolsters.

Upper assembly may consist of a centrally oriented back flap created by two substantially vertical slots (12) extending from the external perimeter communicating with all the substantially horizontal back slots (11). There is mating reversably fastening elements at the margins of the back flap (example with hook elements) with the child car seat cover (example with loop elements) (See FIG. 5). The vertical slots may communicate with the back slots at any point (11) creating openings in the back slots for release of the shoulder belts. The back flap acts as one piece from the upper perimeter to the lowest back slots. The back flap may contain horizontal slots that communicate with the vertical slots.

Upper assembly may consist of a centrally oriented vertical slot (13) extends from the uppermost perimeter through the approximate center of substantially horizontal multiple continuous back slots. The vertical slit may extend to the lowest back slots or may continue to communicate with the thigh straps. There is mating reversably fastening elements on the child car seat cover at the margins of the vertical slit (See FIGS. 6 and 11).

With respect to both the upper and lower assembly, the use of reversably mating fastening elements may consist of; strips of hook and loop fasteners, snaps, buttons or zippers which allow for easy removal and installation. The margins and upper perimeter may be fastened with stainless steel or plastic snaps, zippers or other reusable and reversible fasteners to help guide the mating fastening elements and conform the cover to the seat shell.

The lower assembly may consist of a centrally oriented bottom flap created by 2 slots (23a) extending from each thigh belt opening (23) to the outer perimeter. There is mating reversably fastening elements at the margins of the bottom flap to the child car seat cover. (See FIGS. 4, 4a, 4b and 4c).

The lower assembly may consist of substantially vertically oriented slots that extends from the outer perimeter to an area around the buckle assembly and splits to two slots that communicate with each thigh belt opening. This configuration may resemble a "Y" (See FIG. 4c).

Figure 6:
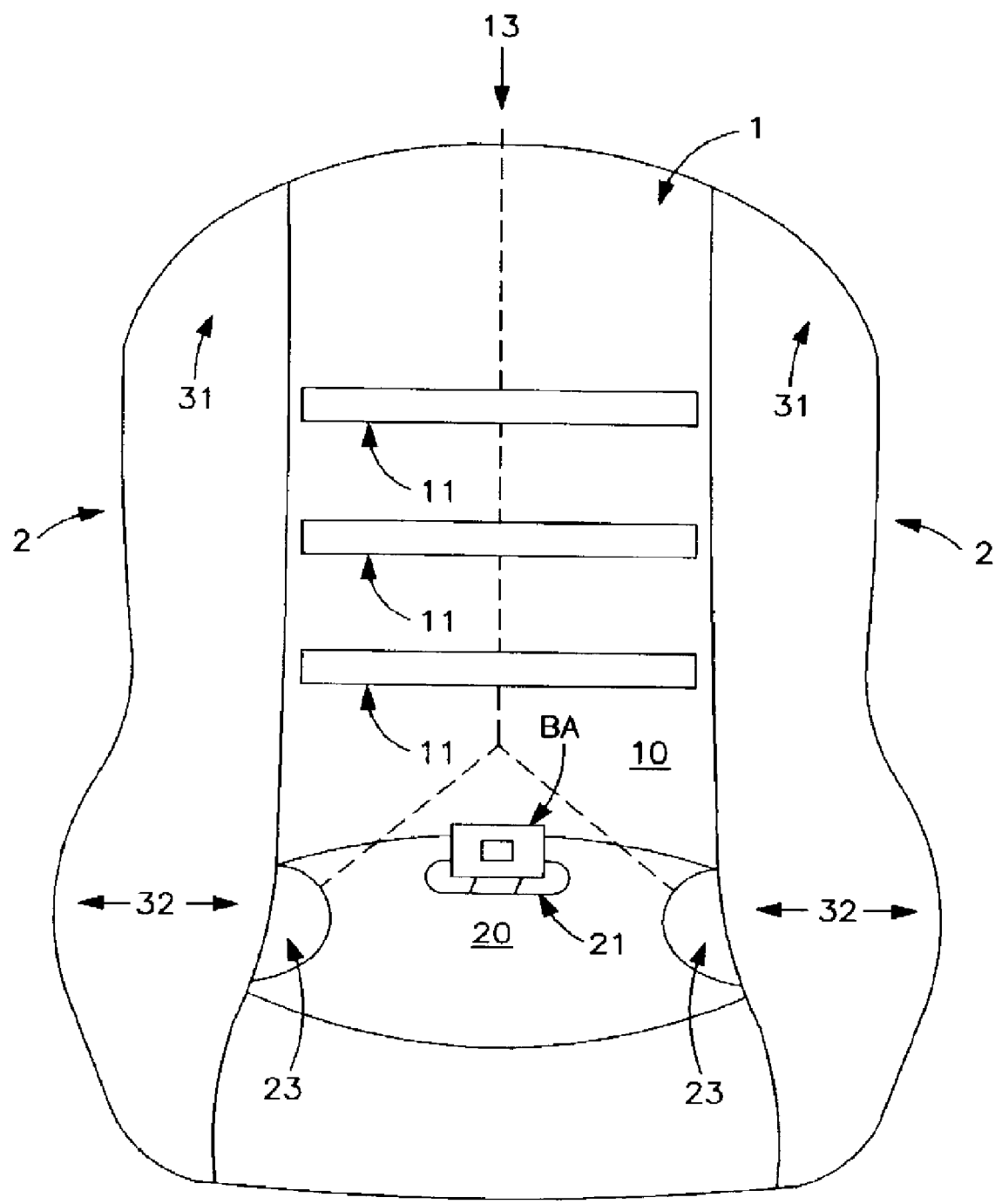
FIG. 6 is a front view of an alternate embodiment of a car seat cover of the present invention showing a center slot communicating with each shoulder strap opening and connecting to each thigh belt opening.
Figure 7:
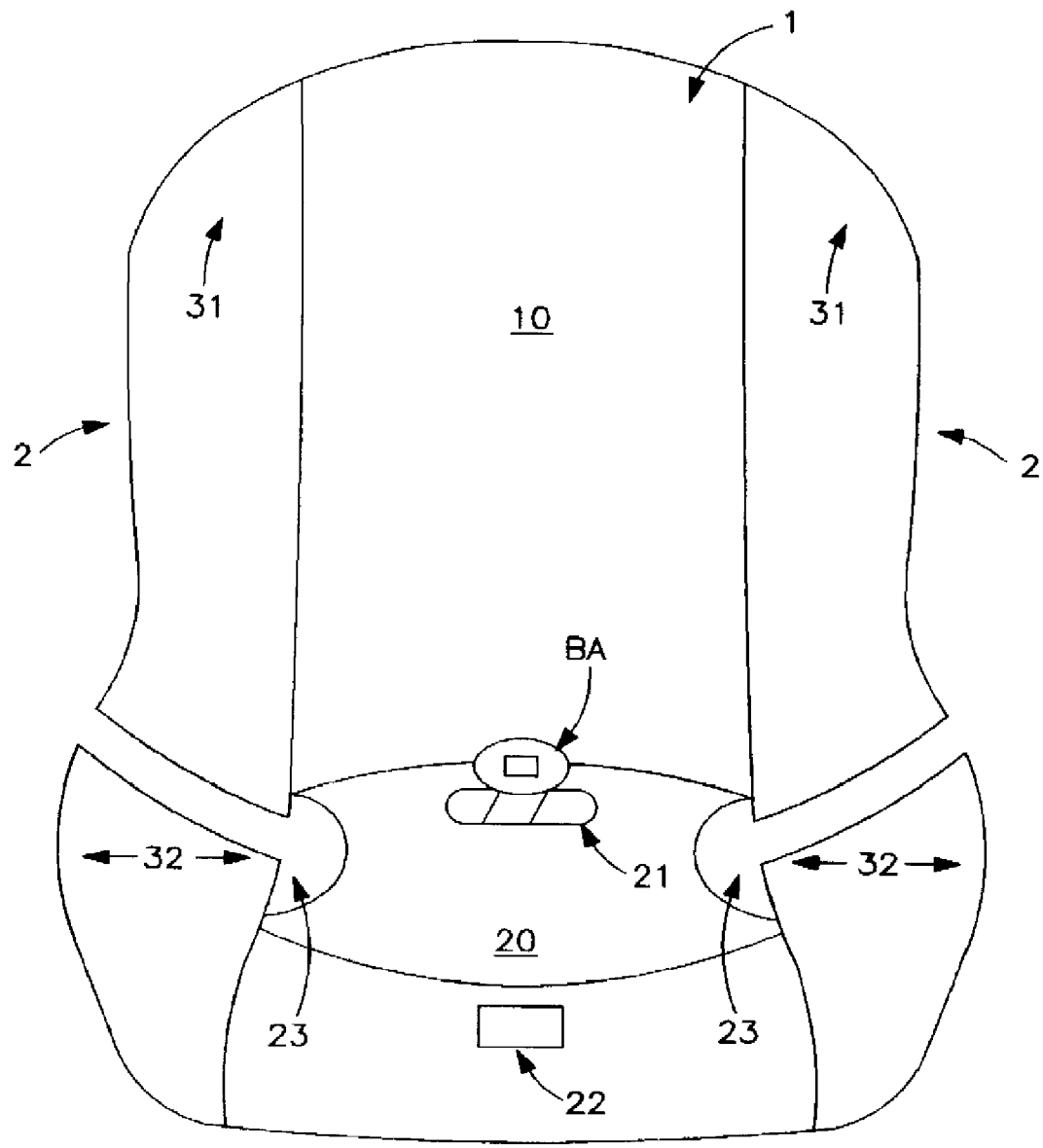
FIG. 7 is a front view of the car seat cover of FIG. 4 shown partially disassembled.
Figure 8:
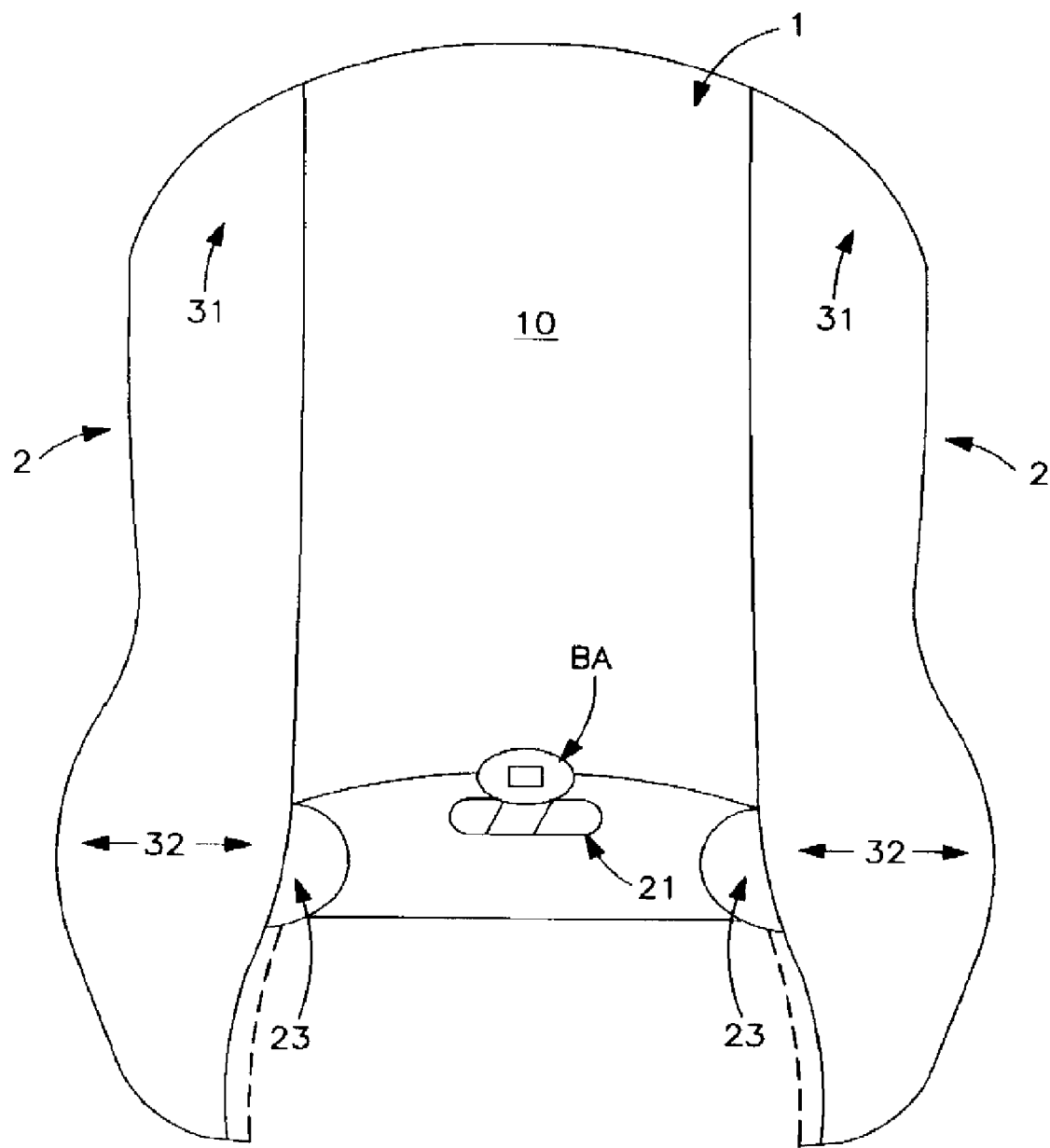
FIG. 8 is a front view of the car seat cover of FIG. 4a shown partially disassembled.
Figure 9:
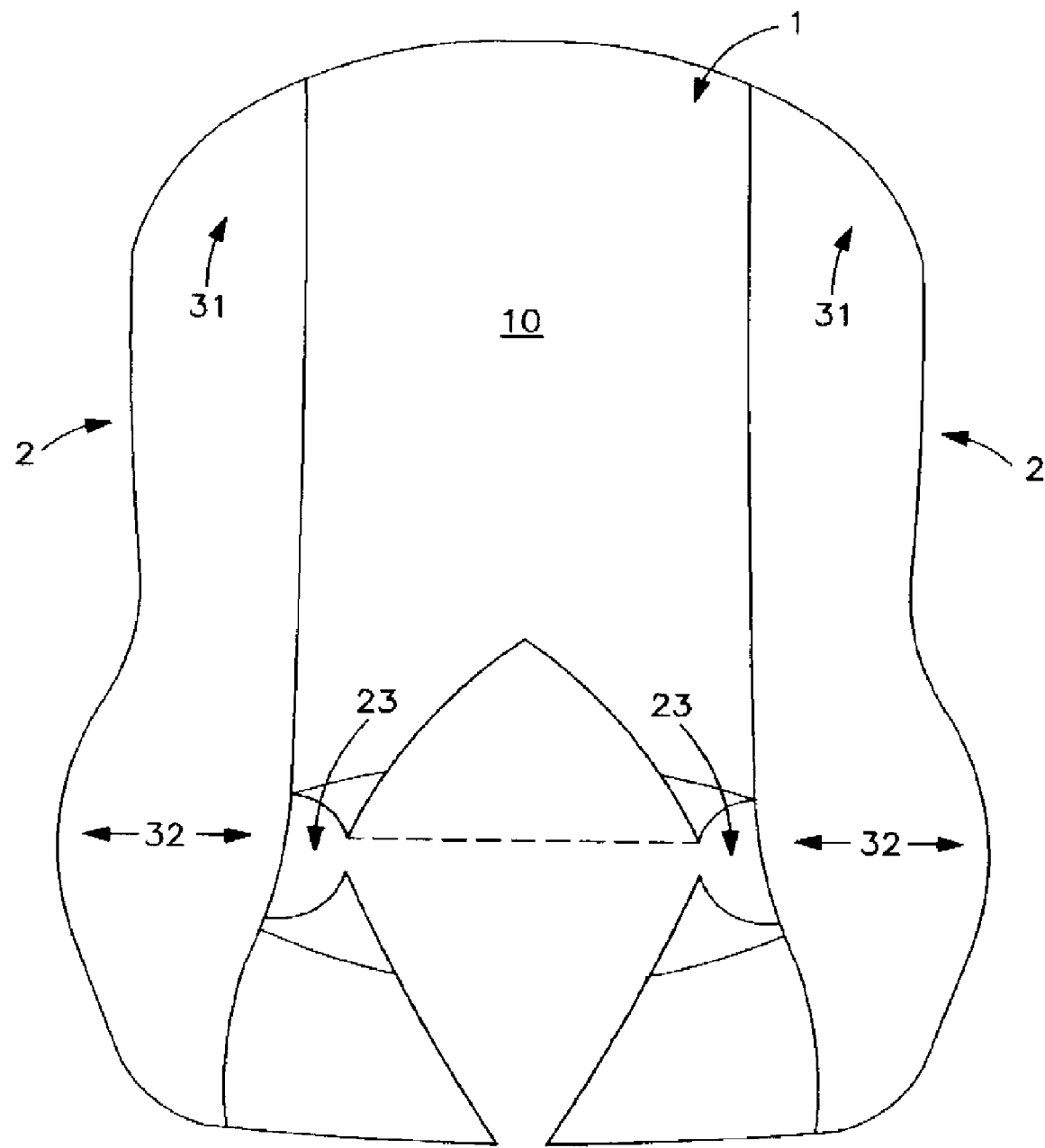
FIG. 9 is a front view of the car seat cover of FIG. 4b shown partially disassembled.
Figure 11:
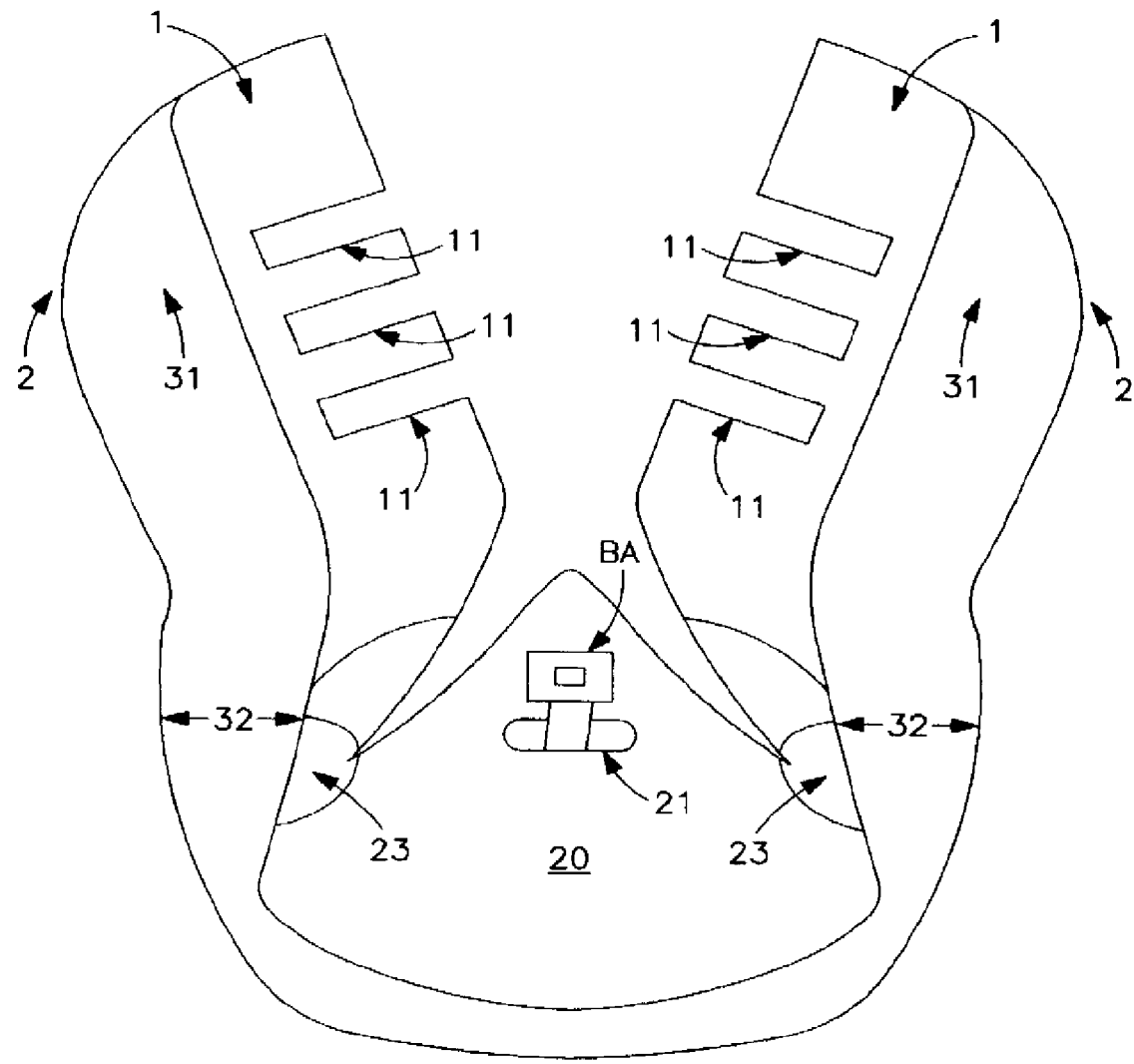
FIG. 11 is a front view of an alternate embodiment of a car seat cover of the present invention showing the car seat cover of FIG. 6 having one central slot communicating with two thigh strap openings ("inverted Y").

The lower assembly may consist of slot(s) (23a) that communicate with the thigh belt openings (23) from the outer perimeter and the slots communicate with a central slot from the upper assembly previously described (See FIGS. 6 and 11).

The above child car seat cover (1) descriptions arrangement allows the child car seat cover (1) to be removed from the seat shell (2) without having to dismantle the harness and unthread the shoulder straps (3) from the car seat shell. The shoulder belts (3) are normally released from the buckle assembly. The upper perimeter fasteners would be released to allow the back flap to be pulled down between the shoulder straps and split the shoulder belt slots. The back portion of the child car seat cover is tucked under the shoulder straps and pulled away from the car seat shell and the shoulder straps.

Figure 10:
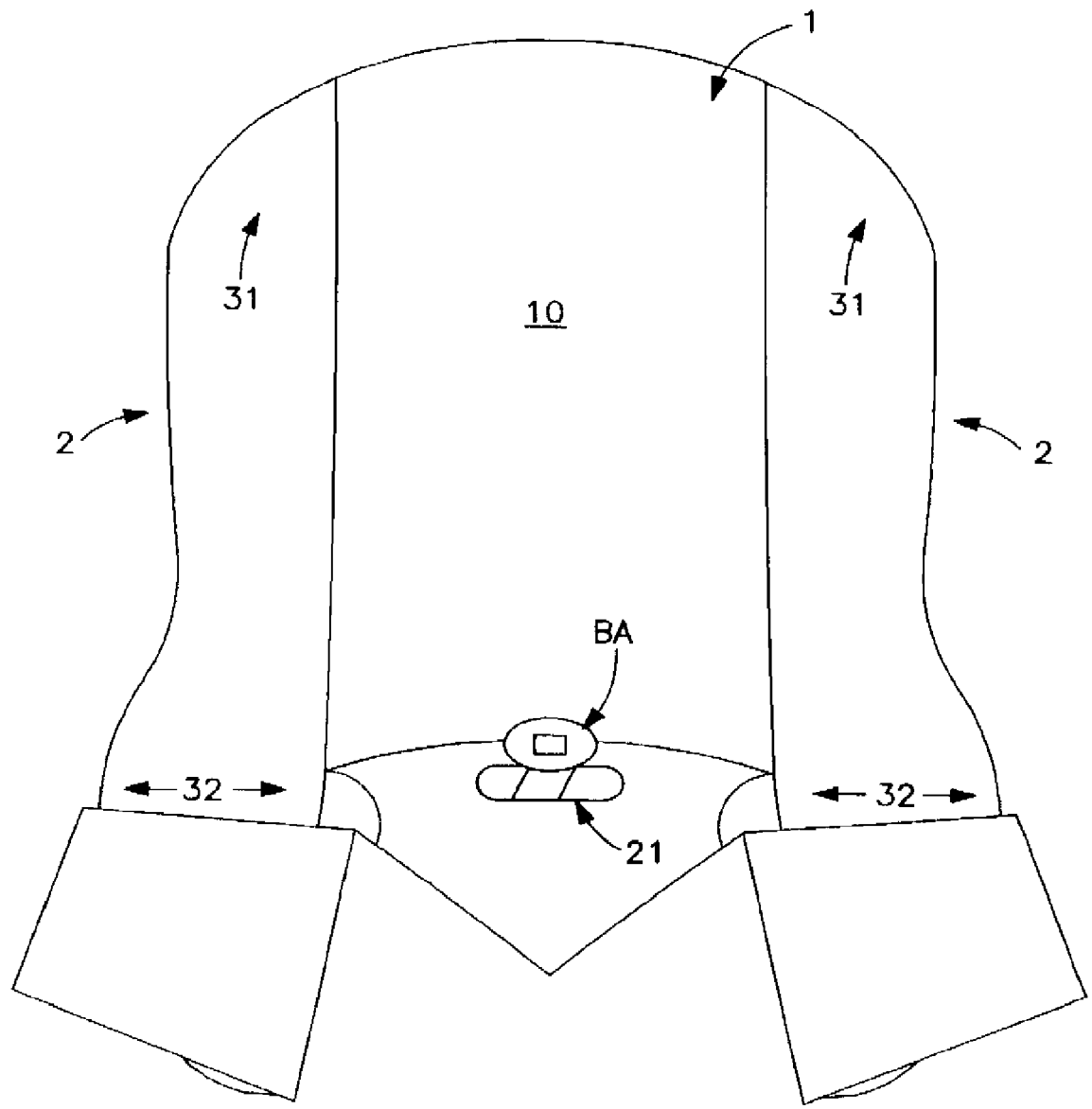
FIG. 10 is a front view of a car seat cover of FIG. 4c shown partially disassembled.

The lower assembly is released by releasing the lower assembly fastener(s) at the lower perimeters and folding up the bottom flap (see FIGS. 7, 8 and 9) or opening up the "Y" configuration slots to communicate with the thigh belt openings (see FIG. 10).

Alternatively, the child car seat cover may be removed from the car seat shell by releasing the upper perimeter fastener and open a vertical slit that splits continuous shoulder strap slots. This vertical slit communicates with thigh belt openings and the entire child car seat cover is pulled away from the car seat shell.

The child car seat cover (1) may be made from a wide variety of fabrics or materials, including fabric-covered vinyl or any other material or fabric commonly used for seat covers. The materials should be durable and be easily cleaned.

This child car seat cover may be utilized on infant, child convertible and child booster seats.

Other possible variations of the present invention can be made to accommodate the varying styles and configurations of car seats made. For example, in car seats having attached adjustable headrests wherein the adjustable headrests contain the shoulder belts, the car seat covers of the present invention can comprise two parts: A first portion comprising a single slot lined, each side of which is preferably lined by reversable mating fastening elements, extending from the outer perimeter to the lowest part of the child car seat cover behind the adjustable headrest and shoulder belts. The adjustable head rest and shoulder strap requires horizontal or vertical openings to the level of the shoulder belts and back slots allowing the pad of the head rest and shoulder belts be released. To release the upper assembly of the child car seat cover, an upper perimeter fastener is released and a vertical slit is opened to release the upper assembly. The second portion or lower assembly of the child car seat covers of the present invention can be released by mechanisms described previously.

We claim:

1. An improved removable child car seat cover comprising a back portion joined to a bottom portion, wherein the back portion comprises at least two shoulder strap slots and the bottom portion comprises at least left and right thigh belt slots wherein a single vertically oriented slot extends from an uppermost perimeter of the back portion of the cover to the at least left and right thigh belt slots wherein the vertical slot connects each slot in the back and bottom portions of the car seat cover.

2. The car seat cover of claim 1 wherein the vertically oriented slot is "Y" shaped.

* * * * *